United States Patent
Baker

[15] 3,646,786
[45] Mar. 7, 1972

[54] EQUIPMENT ACCESSORY LOCKING APPARATUS

[72] Inventor: Paul I. Baker, 15018 Moorepark, Sherman Oaks, Calif. 91403

[22] Filed: Mar. 6, 1970
[21] Appl. No.: 17,165

[52] U.S. Cl. ....................................................70/59
[51] Int. Cl. ...............................................E05b 73/00
[58] Field of Search ..................70/58, 59, 63, 14

[56] References Cited

UNITED STATES PATENTS 3,436,936   4/1969   Locker .........................................70/59

FOREIGN PATENTS OR APPLICATIONS 367,725   4/1963   Switzerland ..............................70/59

Primary Examiner—George F. Mautz
Assistant Examiner—Edward J. McCarthy
Attorney—Roger A. Marrs

[57] ABSTRACT

A releasable locking arrangement is disclosed herein having a receptacle portion mounted on the shell of a helmet which includes a central opening defined by a circular flange. A latch mechanism including a slidable shaft carrying an expandable means is utilized which is adapted to be inserted through the central opening of the receptacle and subsequently expanded into gripping and holding relationship with the flange. The latch mechanism is mounted on a part of a vehicle and includes a lock for selectively operating the latch mechanism into and out of engagement with the receptacle portion.

15 Claims, 8 Drawing Figures

PATENTED MAR 7 1972
3,646,786
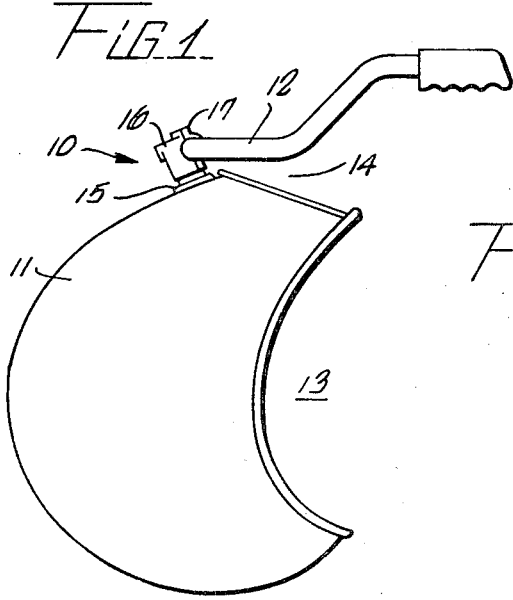
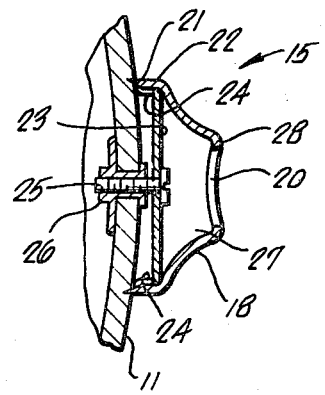
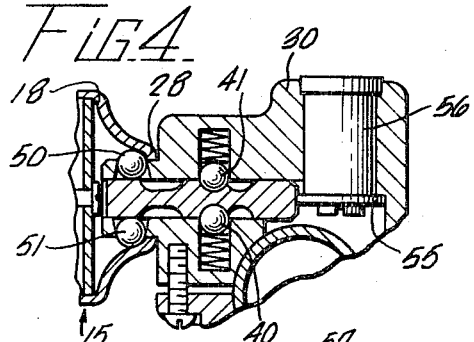
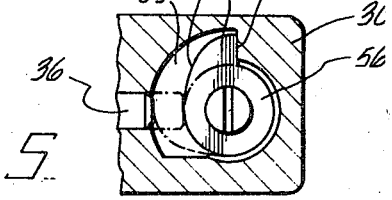
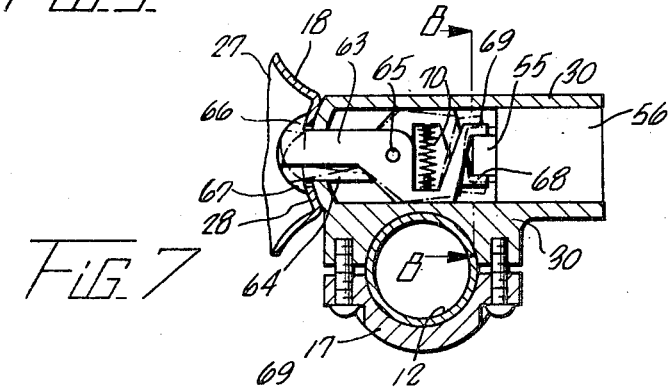
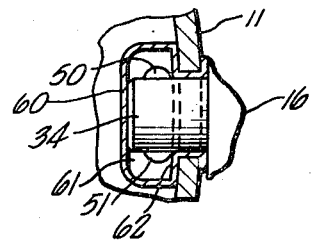
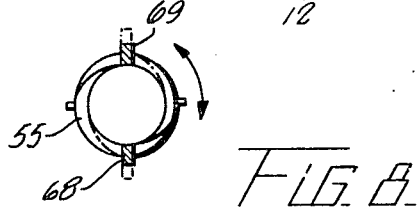
INVENTOR.
PAUL I. BAKER
BY
Roger G. Marrs

EQUIPMENT ACCESSORY LOCKING APPARATUS

BACKGROUND OF THE INVENTION

1. Field of the Invention

This invention relates to locking apparatus and, more particularly, to a novel locking arrangement for detachably mounting a sports accessory, such as a helmet, to a major structure employed in the sport or associated activity, such as a vehicle, for example.

2. Description of the Prior Art

When engaging in sports or other activities which require body protection or accessory equipment, such as helmets, for example, it is awkward and inconvenient to mount or rest the equipment on a major structure such as a vehicle or potion thereof when not in use. For example, when a motorcycle is parked, substantial skill is required to balance or brace the helmet on the seat, rack or handlebars if the driver is occupied elsewhere in a location which does not require the use of the helmet or the motorcycle. Also, during his absence from the immediate vicinity of his equipment, others may steal or take the equipment without notice of the owner.

Prior attempts have been made to devise a suitable, releasable coupling for securing the equipment to the vehicle and one such attempt is disclosed in U.S. Pat. No. 3,436,936. However, these prior devices have not been entirely satisfactory since the helmet material is relatively brittle and may break away from around the latching receptacle after continued usage. Sometimes, the helmet per se may be twisted or rotated in a manner which dislodges the latching receptacle or mechanism so that the helmet may be released without the use of a proper key. Furthermore, conventional locking or latching assemblies do not permit snap-lock engagement of the latching mechanism but requires latch engagement and disengagement only upon key-lock rotation.

SUMMARY OF THE INVENTION

Accordingly, the difficulties and problems encountered with conventional latch-lock mechanisms for releasably securing accessory equipment to a major structure are obviated by the present invention which provides an apertured receptacle which is mounted on the shell of a conventional helmet which includes means for preventing the rotation of the receptacle thereon. A lock mechanism is attached to a portion of a motorbike, such as the handlebar, for example, and includes a latch mechanism having an expandable means, such as resiliently biased dog-ears or a ball latch mechanism, adapted to snap-lock into the aperture of the receptacle to effect locking engagement therewith. The latch mechanism is selectively operated by a conventional key lock mechanism of the pin and tumbler type which is operably disposed with respect to the latch mechanism via an irregularly shaped cam.

Therefore, it is among the primary objects of the present invention to provide a novel key operated, latch mechanism adapted to releasably lock and mount a protective helmet onto the structure of a motorcycle so that the helmet cannot be removed therefrom without a proper key.

Another object of the present invention is to provide a novel key latch mechanism and key lock assembly for operating the latch mechanism which will readily support a helmet on the structure of a motorcycle without causing material fatigue in the shell of the helmet or the structure of the bicycle.

Another object of the present invention is to provide a novel snap-lock mechanism for releasably engaging or mounting a helmet on the structure of a motorcycle.

Yet another object of the present invention is to provide a fail-safe lock mechanism and mounting structure therefor capable of resisting rotational or twisting efforts to remove the locked article from a structure without the use of a proper key.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of a typical helmet incorporating the locking arrangement of the present invention so as to be releasably supported from the handlebar of a conventional motorcycle;

FIG. 2 is an enlarged sectional view of the receptacle portion of the locking arrangement carried on the shell of the helmet;

FIG. 3 is a cross-sectional view of the locking arrangement illustrated preparatory to snap-lock engagement with the receptacle portion;

FIG. 4 is a view similar to the view of FIG. 3 showing the locking arrangement fully engaged;

FIG. 5 is a fragmentary cross-sectional view of the cam lock mechanism as taken in the direction of arrows 5—5 of FIG. 3;

FIG. 6 is a fragmentary cross-sectional view of another embodiment of a receptacle portion used in the practice of the present invention;

FIG. 7 is a cross-sectional view of another embodiment of a locking arrangement; and FIG. 8 is a fragmentary sectional view of the cam lock mechanism shown in FIG. 7 as taken in the direction of arrows 8—8.

DESCRIPTION OF THE PREFERRED EMBODIMENT

Referring to FIG. 1, the novel locking arrangement of the present invention is indicated in the general direction of arrow 10 which is employed for releasably holding a conventional helmet 11 onto a selected portion of a bike or motorcycle, such as handlebars 12. The helmet 11 includes an outer shell generally composed of a hard plastic material having a major opening, as indicated by numeral 13, for exposing the face of the wearer and a neck opening, indicated by numeral 14, for accommodating and enclosing the nape of the neck of the wearer. Immediately disposed behind the neck opening 14 and located along the central longitudinal axis thereof, there is provided an anchoring means that takes the form of an apertured receptacle 15 which is mounted on the shell of the helmet 11. The receptacle 15 is releasably secured to a lock mechanism 16 that is secured to the handlebar 12 by means of a suitable "C" clamp 17.

Generally, it is preferred that the helmet 11 downwardly depends from the locking or latching mechanism 16 not only from the point of view of suspending the weight thereof from the handlebars but so that ready connection can be made between the locking mechanism 16 and the receptacle 15 by the owner of the helmet. Also, it is a criticality of the present invention that the anchoring means represented by receptacle 15 be disposed on the exterior surface of the helmet immediately adjacent the edge marginal region thereof which defines the neck opening 14. By permanently placing the anchoring means in this location, it does not impede nor interfere with the use of the helmet or the general design thereof.

Referring to FIG. 2 in detail, an enlarged view of the anchor means 15 is illustrated in which an apertured receptacle 18 is provided having a central opening or aperture 20 formed in a raised portion thereof extending above the exterior surface of a helmet shell 11. The receptacle further includes a plurality of sharp points 21 formed about its base 22 which are adapted to penetrate the material of the helmet shell when the receptacle 18 is drawn into position. Securement means are provided which may comprise a plate 23 having an outer edge marginal region which bears against an inner portion 24 of the receptacle when a central screw fastener 25 is tightened by means of a threadable connection with a mounting insert 26.

The interior of the receptacle 18 forms a hollow or inner cavity 27 and communicates exteriorly thereof via the opening 20. The opening 20 is defined by a circular flange 28. In some constructions or designs, the flange may include a slightly concave outer pressure facing so as to prevent dislodgment of the helmet from the locking means 16 which, in turn, may have a corresponding convex surface. Such construction would prevent separation of the receptacle from the helmet as might be otherwise achieved by rotating the helmet.

Referring now to FIG. 3, the cross-sectional view of the receptacle 18 carried on the helmet shell 11 and the locking means 16 is shown in cross section as mounted on the handlebar 12. The locking means includes a body portion 30 having a semicircular cutout 29 adapted to engage with one side of the handlebar while the C-clamp 17 engages with the opposite side of the handlebar. Screw-type fasteners 31 and 32 may be employed to secure the clamp 17 to the body portion 30 so that the assembly is retained on the handlebar. However, it is to be understood that other fastening means may be employed, such as rivets, welding or the like, so that a permanent or semipermanent securement is produced.

Body portion 30 further includes an elongated, open-ended bore 33 which extends between the end of an integral projection 34 and an inner cavity 35. Slidably mounted within the bore 33, there is provided a shaft 36 having one of its ends 37 adapted to be disposed within the cavity 27 of receptacle 18 so as to bear against the head of the screw 25. The opposite end of shaft 36 from its end terminating as indicated by numeral 37, terminates in the inner cavity 35. Shaft 36 further includes detent means which comprises a pair of resiliently biased balls 40 and 41 which are urged into mating a first pair of receptacles formed in the shaft. However, a second pair of receptacles are located adjacent to the aforementioned receptacles that are adapted to receive the resiliently biased balls 40 and 41 when the shaft 36 is slidably moved within its bore on body 30. Consequently, shaft 36 may be disposed in the position as shown in FIG. 3 or as shown in FIG. 4 with the balls 40 and 41 in their respective receptacles for yieldably holding the shaft in either of its two alternate positions. An enlarged diameter portion separates the two pairs of receptacles over which the balls 40 and 41 ride when the shaft is slid in its bore.

Disposed adjacent end 37, there is provided an expandable means which takes the form of a pair of balls 50 and 51 which are partially enclosed within respective apertures formed in extension 34 of the body 30 and partially supported or seated in a pair of notches or recesses formed in shaft 36. The respective notches or recesses in which the balls 50 and 51 are seated, are in alignment with respective holes formed in extension 34 of the body portion 30. By aligning the respective holes with the recesses in which the balls 50 and 51 are seated, the balls will project into the holes but will not project beyond the exterior surface of the extension. This relationship is shown in FIG. 3 which permits the end of the shaft 36 including the extension 34 to be inserted through the opening 20 in the receptacle 18. When the tip 37 of the shaft strikes against the fastener 25, the body portion 30 including extension 34 will continue to move into the cavity 27 while further movement of the shaft is arrested. The continued movement of extension 34 into the cavity causes the balls 50 and 51 to be forced outwardly from their respective seated positions within the recesses so that the balls 50 and 51 assume the expanded position as shown in FIG. 4

In FIG. 4, the shaft 36 is releasably held in position due to the fact that the balls 40 and 41 have changed from the first set of receptacles to the second set. Also, the balls 50 and 51 ride on the outer surface of the shaft 36 adjacent the end 37. However, balls 50 and 51 still reside within the opposite holes formed in extension 34 and bear beyond the outer surface or periphery of the extension against the flange 28. Therefore, the extension and shaft cannot be dislodged from the receptacle due to the expanded interference of balls 50 and 51 with flange 28.

It is noted that the space between the end of shaft 36 opposite to its end indicated by numeral 37 and a cam 55 provides a substantial clearance as shown in FIG. 3 while the extension 34 and shaft end 37 are being inserted through aperture 20. However, as shown in FIG. 4, when the end 37 has been pressed against screw 25 and the balls 50 and 51 have expanded into the locking position, the clearance has been eliminated so that shaft 36 bears against the cam 55. While in this position, as shown in FIG. 4, the locking means 16 cannot be dislodged from the receptacle 50. However, by means of the insertion of a key into a conventional pin and tumbler lock mechanism 56, the eccentric cam 55 can be rotated so that its extended eccentric portion, as indicated in FIG. 5 by numeral 57, will bear against the end of shaft 36 and force the body portion 30 including the extension 34 to the right side of the drawing while the shaft 36 remains in place. This action causes the balls 50 and 51 to be positioned within their respective recesses in the shaft so that they will be seated therein as shown in FIG. 3.

In FIG. 5, it can be seen that the cam 55 rotates within cavity 35 and includes cam surface 57 which rides against the end of shaft 36 when the lock 56 is rotated. Rotational limits are placed on the cam 55 by means of a shoulder 58 at one end, as shown in broken lines, and by means of the cam 55 engaging with the end of shaft 36 as shown in solid lines.

Referring now to FIG. 6, another embodiment of the anchoring means 15 is illustrated wherein an aperture is provided in the shell 11 of the helmet and a receptacle 16 is secured thereto which provides a cavity 61 having an entrance thereto opening exteriorly of the receptacle. The extension and shaft of the locking means is inserted through the opening to cavity 61 and the shaft end 37 strikes against the bottom of receptacle 60 which causes the expansion means in the form of balls 50 and 51 to expand outwardly in blinding relationship with the circular flange 62 of the receptacle. By this means, the receptacle is located between the shell and the liner of the helmet so as to be interiorly disposed of the helmet shell whereas the embodiment shown in FIG. 2 is carried on the external surface of the helmet shell and projects outwardly therefrom. Furthermore, since the main body of the receptacle 60 lies underneath the helmet shell 11, it would be impossible to dislodge or otherwise remove the receptacle in order to separate the helmet from the locking means without the proper key.

Referring now to FIGS. 7 and 8 in detail, another embodiment of an expandable means incorporated into the present invention is illustrated. As described with respect to the previous embodiment, body portion 30 houses a keylock mechanism 56 which includes a rotatable eccentric cam 55. However, a pair of scissor-type members 63 and 64 are provided which are pivotally mounted on a pivot 65. One end of the members includes outwardly projecting lugs such as lug 66 associated with member 65 and lug 67 carried on the end of member 64. The opposite ends of the members from their ends carrying the lugs include leg portions 68 and 69 which are disposed on opposite sides of the eccentric cam 55. The legs are normally biased together against the surface of the cam 55 by means of an expansion spring 70. However, upon insertion of the key into the lock and rotation thereof so as to rotate the cam 55, the legs 68 and 69 are separated against the spring bias of spring 70. This in turn pivots the members 63 and 64 on pivot 65 so that the lugs 66 and 67 are withdrawn from the circular receptacle edge or flange 28. When the lugs are so withdrawn, the helmet receptacle 18 may be withdrawn from the locking means. For mounting the helmet onto the locking means, it is only necessary that the lugs 66 and 67 be forcibly urged through the aperture in the receptacle where the lugs will automatically expand or snap-lock outwardly when the lugs are within the cavity 27.

In view of the foregoing, it can be seen that the locking mechanism of the present invention will permit a snap-lock relationship between the receptacle and the expansion means whether such means takes the form of balls 50 and 51 or lugs 66 and 67. For removal of the helmet or separation between the receptacle and the locking means, a key is inserted into the locking member and rotated to operate the cam 55 which in turn operates the expansion means so that it is drawn within the confines of the opening or hole leading into the interior of the receptacle.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A releasable securement device for holding a helmet onto a supporting structure wherein said helmet has a lower edge adapted to fit about the nape of the wearer's neck, comprising:
   an apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure; and
   said anchor means includes a receptacle having a continuous sidewall defining an enclosed cavity and formed with a central hole defining an entrance into said cavity so as to insertably receive said expandable portion.

2. A releasable securement device for holding a helmet onto a supporting structure wherein said helmet has a lower edge adapted to fit about the nape of the wearer's neck, comprising:
   an apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure;
   said expandable portion includes a slidably mounted shaft having a pair of balls seated therein; and
   means carried on said expandable portion for forcibly urging said balls out of their seated relationship on said shaft into a binding or locking relationship with said receptacle sidewall.

3. A releasable securement device for holding a helmet onto a supporting structure wherein said helmet has a lower edge adapted to fit about the nape of the wearer's neck, comprising:
   an apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure;
   said expandable portion includes a pair of pivotally mounted members, each member having a lug carried on one end thereof insertable into said anchor means and said members being differentially pivoted so as to expand said lugs into locking relationship with said anchor means; and
   resilient means biasing said members so as to normally extend said lugs into a yieldable expanded position so as to permit said locking means to snap-lock into holding or gripping relationship with said anchor means.

4. A releasable securement device for holding a helmet onto a supporting structure wherein said helmet has a lower edge adapted to fit about the nape of the wearer's neck, comprising:
   An apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure; and
   detent means for yieldably holding said expandable portion into either its locked or unlocked position.

5. A releasable securement device for holding a helmet onto a supporting structure wherein said helmet has a lower edge adapted to fit about the nape of the wearer's neck, comprising:
   an apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure; and
   said anchor means includes a receptacle carried on said helmet and having an opening coaxial with a hole in said helmet wherein said expandable portion is insertably received through said opening into said abutment relationship with said anchor means.

6. A releasable securement device for holding a helmet onto a supporting structure wherein said helmet has a lower edge adapted to fit about the nape of the wearer's neck, comprising:
   an apertured anchor means carried on said helmet immediately adjacent to said lower edge thereof;
   a locking means carried on said supporting structure incorporating an expandable portion;
   means operably carried on said locking means for expanding said expandable portion in response to forcible abutment with said anchor means so as to attach said helmet to said supporting structure;
   said last-mentioned means being responsive to a coded key for contracting said expandable portion to separate said helmet from said supporting structure;
   said locking means includes a body portion;
   said expandable portion movably carried on said body portion;
   detent means resiliently and yieldably maintaining said expandable portion in either its lock or unlocked positions; and
   a pin and tumbler key lock operably coupled to said expandable portion to expand and contract said expandable portion with respect to its locking engagement with said anchor means.

7. The invention as defined in claim 4 wherein
   said anchor means includes a receptacle having a continuous sidewall defining an enclosed cavity and formed with a central hole defining an entrance into said expandable cavity so as to insertably receive said expandable portion.

8. The invention as defined in claim 4 wherein
   said expandable portion includes a slidably mounted shaft having a pair of balls seated therein; and
   means carried on said portion for forcibly urging said balls out of their seated relationship on said shaft into a binding or locking relationship with said receptacle sidewall.

9. The invention as defined in claim 4 wherein
   said expandable portion includes a pair of pivotally mounted members, each member having a lug carried on one end thereof insertable into said anchor means and said members being differentially pivoted so as to expand said lugs into locking relationship with said anchor means.

10. The invention as defined in claim 9 including resilient means biasing said members so as to normally extend said lugs into a yieldable expanded position so as to permit said locking means to snap-lock into holding or gripping relationship with said anchor means.

11. The invention as defined in claim 1 including detent means for yieldably holding said expandable portion into either its locked or unlocked position.

12. The invention as defined in claim 1 wherein said last-mentioned operable means includes an eccentric cam rotatably carried on said locking means and key-lock pin and tumbler set carried on said locking means for rotating said cam into binding relationship with said expandable means in its expanded, locked condition.

13. The invention as defined in claim 4 wherein said anchor means includes a receptacle carried on said helmet and having an opening coaxial with a hole in said helmet wherein said expandable portion is insertably received through said opening into said abutment relationship with said anchor means.

14. The invention as defined in claim 1 wherein
said locking means includes a body portion;
said expandable portion movably carried on said body portion;
detent means resiliently and yieldably maintaining said expandable portion in either its lock or unlocked positions; and
a pin and tumbler key lock operably coupled to said expandable portion to expand and contract said expandable portion with respect to its locking engagement with said anchor means.

15. The invention as defined in claim 6 including
an eccentric cam operated by said key lock for effecting unlocking of said expandable portion.

* * * * *